(12) United States Patent
Allababidi et al.

(10) Patent No.: US 9,558,341 B1
(45) Date of Patent: Jan. 31, 2017

(54) INTEGRATED USER PROFILE ADMINISTRATION TOOL

(75) Inventors: Mouaz Allababidi, Arlington, TX (US); Balagurunathan Balasubramanian, Irving, TX (US); Kenneth J. Golden, Lawrence, KS (US); Shrikant D. Jannu, Frisco, TX (US); Nadirshah N. Jivani, Carrollton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1669 days.

(21) Appl. No.: 11/403,619

(22) Filed: Apr. 13, 2006

(51) Int. Cl.
G06F 17/30 (2006.01)
G06F 21/41 (2013.01)

(52) U.S. Cl.
CPC ................................. G06F 21/41 (2013.01)

(58) Field of Classification Search
CPC ........................................................ G06F 21/41
USPC ........................................................ 707/9, 783
See application file for complete search history.

(56) References Cited

U.S. PATENT DOCUMENTS

| | | | |
|---|---|---|---|
| 5,293,488 A | 3/1994 | Riley et al. | |
| 5,659,547 A | 8/1997 | Scarr et al. | |
| 5,742,668 A * | 4/1998 | Pepe et al. | 455/415 |
| 5,742,905 A * | 4/1998 | Pepe et al. | 455/461 |
| 5,991,882 A | 11/1999 | O'Connell | |
| 6,009,177 A | 12/1999 | Sudia | |
| 6,205,478 B1 | 3/2001 | Sugano et al. | |
| 6,240,512 B1 | 5/2001 | Fang et al. | |
| 6,321,334 B1 | 11/2001 | Jerger et al. | |
| 6,471,486 B1 | 10/2002 | Centers et al. | |
| 6,473,503 B1 * | 10/2002 | Karau | H04M 3/42144 379/221.13 |
| 6,519,647 B1 | 2/2003 | Howard et al. | |
| 6,609,115 B1 | 8/2003 | Mehring et al. | |
| 6,816,871 B2 | 11/2004 | Lee | |
| 6,836,799 B1 | 12/2004 | Philyaw et al. | |
| 6,898,577 B1 | 5/2005 | Johnson | |
| 7,016,875 B1 | 3/2006 | Steele et al. | |
| 7,089,585 B1 | 8/2006 | Dharmarajan | |
| 7,155,614 B2 | 12/2006 | Ellmore | |

(Continued)

OTHER PUBLICATIONS

Pashalidis et al. (A Taxonomy of Single Sign-on Systems, Information Security and Privacy, 2003.*

(Continued)

Primary Examiner — Albert Phillips, III (57) ABSTRACT

A computer system is provided including a single sign-on system with applications and a data store storing user profiles, each including a user ID, wherein each of the user profiles has a corresponding application password for one or more of the applications, and a user profile administration tool. The user profile administration tool includes a password provisioning section where an administrator selects a user profile and further selects an application type. The application type includes an application type wherein the administrator resets the password for one or more of the applications. The application type also includes a stand-alone application type wherein the administrator resets a password for a stand-alone application. The user profile administration tool further includes a password synchronizing section wherein the user profile administration tool automatically synchronizes the application passwords with each of the corresponding user profiles.

19 Claims, 4 Drawing Sheets

(56) References Cited

U.S. PATENT DOCUMENTS

| | | | |
|---|---|---|---|
| 7,194,764 | B2 | 3/2007 | Martherus et al. |
| 7,251,732 | B2 | 7/2007 | Jamieson et al. |
| 7,260,581 | B1 | 8/2007 | Cimini et al. |
| 7,260,838 | B2 | 8/2007 | Bones et al. |
| 7,330,971 | B1* | 2/2008 | Kukreja ............... H04L 63/083 709/203 |
| 7,350,229 | B1 | 3/2008 | Lander |
| 7,428,750 | B1 | 9/2008 | Dunn et al. |
| 7,496,756 | B2 | 2/2009 | Oka et al. |
| 7,496,954 | B1 | 2/2009 | Himawan et al. |
| 7,503,065 | B1 | 3/2009 | Packingham et al. |
| 7,636,852 | B1 | 12/2009 | Balasubramanian et al. |
| 7,639,794 | B2 | 12/2009 | Iwatsu et al. |
| 8,006,298 | B1 | 8/2011 | Balasubramanian et al. |
| 8,195,819 | B1 | 6/2012 | Delker et al. |
| 8,443,429 | B1 | 5/2013 | Johnson, Sr. et al. |
| 8,554,934 | B1 | 10/2013 | Delker et al. |
| 9,059,987 | B1 | 6/2015 | Lofland et al. |
| 2002/0091639 | A1* | 7/2002 | Mandahl et al. ............... 705/50 |
| 2002/0147914 | A1* | 10/2002 | Arnold .................... G06F 21/32 713/186 |
| 2003/0120593 | A1* | 6/2003 | Bansal et al. .................... 705/39 |
| 2003/0154403 | A1 | 8/2003 | Keinsley et al. |
| 2004/0019595 | A1* | 1/2004 | Bhogal ............. G06F 17/30289 |
| 2004/0034594 | A1* | 2/2004 | Thomas et al. ................. 705/39 |
| 2004/0117386 | A1* | 6/2004 | Lavender et al. ............ 707/100 |
| 2004/0148565 | A1 | 7/2004 | Davis et al. |
| 2004/0186882 | A1* | 9/2004 | Ting .................... H04L 63/0861 709/202 |
| 2004/0187029 | A1* | 9/2004 | Ting ......................... G06F 21/32 726/5 |
| 2004/0199795 | A1* | 10/2004 | Grewal ................... G06F 21/41 726/8 |
| 2004/0255154 | A1 | 12/2004 | Kwan et al. |
| 2004/0260942 | A1 | 12/2004 | Jamieson et al. |
| 2004/0260953 | A1 | 12/2004 | Jamieson et al. |
| 2005/0033993 | A1* | 2/2005 | Cooper ................... G06F 21/31 726/19 |
| 2005/0144297 | A1 | 6/2005 | Dahlstrom et al. |
| 2005/0198501 | A1 | 9/2005 | Andreev et al. |
| 2006/0048211 | A1 | 3/2006 | Pierson et al. |
| 2006/0075224 | A1 | 4/2006 | Tao |
| 2006/0095526 | A1 | 5/2006 | Levergood et al. |
| 2007/0209065 | A1 | 9/2007 | Branam et al. |
| 2007/0250905 | A1 | 10/2007 | Clark et al. |
| 2008/0069102 | A1 | 3/2008 | Koehler et al. |
| 2008/0134307 | A1 | 6/2008 | Ashkenazi et al. |
| 2008/0184349 | A1 | 7/2008 | Ting |
| 2008/0285559 | A1 | 11/2008 | Luo et al. |
| 2010/0043065 | A1 | 2/2010 | Bray et al. |
| 2010/0050251 | A1 | 2/2010 | Speyer et al. |
| 2011/0138452 | A1 | 6/2011 | Dooley et al. |
| 2011/0239269 | A1 | 9/2011 | Wahl et al. |

OTHER PUBLICATIONS

Sand et al., OASIS Service Provisioning Markup 2 Language (SPML) v2—Federated 3 Provisioning, Mar. 6, 2006, pp. 1-17.*

Citrix Systems, Citrix MetaFrame Password Manager, Apr. 22, 2004, 1 page.

Office Action dated Apr. 14, 2008; U.S. Appl. No. 10/994,997, filed Nov. 22, 2004.

Office Action dated Apr. 25, 2008; U.S. Appl. No. 10/960,535, filed Oct. 7, 2004.

Office Action dated Jan. 9, 2009; U.S. Appl. No. 10/960,535, filed Oct. 7, 2004.

Office Action dated Apr. 29, 2009; U.S. Appl. No. 10/960,535, filed Oct. 7, 2004.

Notice of Allowance dated Sep. 25, 2009; U.S. Appl. No. 10/960,535, filed Oct. 7, 2004.

Balasubramanian, Balagurunathan, et al., "Fraud Detection System and Method", filed Jul. 11, 2006, U.S. Appl. No. 11/484,420.

Office Action dated Oct. 28, 2010, U.S. Appl. No. 11/484,420, filed Jul. 11, 2006.

Microsoft, Digital Dashboard Business Process Assessment Guide White Paper, May 2000, 17 pages.

Office Action dated May 3, 2011, U.S. Appl. No. 12/502,227, filed Jul. 13, 2009.

Delker, Jason R., et al., Patent Application entitled, "Application Single Sign On Leveraging Virtual Local Area Network Identifier," filed Jul. 13, 2009, U.S. Appl. No. 12/502,227.

Johnson Sr., Robert S., et al., Patent Application entitled "Integrated Sign On," filed May 25, 2010, U.S. Appl. No. 12/786,277.

Notice of Allowance dated Apr. 14, 2011, U.S. Appl. No. 11/484,420, filed Jul. 11, 2006.

Office Action-Restriction dated Feb. 24, 2011, U.S. Appl. No. 12/502,227, filed Jul. 13, 2009.

Final Office Action dated Oct. 11, 2011, U.S. Appl. No. 12/502,227, filed Jul. 13, 2009.

Lofland, Bruce, et al., Patent Application entitled, "Methods and Systems of Using Single Sign-on for Identification for a Web Server Not Integrated with an Enterprise Network," filed Apr. 4, 2013, U.S. Appl. No. 13/857,144. 24 pages.

FAIPP Pre-Interview Communication dated Feb. 27, 2013, U.S. Appl. No. 13/429,320, filed Mar. 24, 2012, 4 pages.

First Action Interview Office Action dated Apr. 12, 2013, U.S. Appl. No. 13/429,320, filed Mar. 24, 2012, 5 pages.

Notice of Allowance dated May 29, 2013, U.S. Appl. No. 13/429,320, filed Mar. 24, 2012, 6 pages.

FAIPP Pre-Interview Communication dated Dec. 23, 2014, U.S. Appl. No. 13/857,144, filed Apr. 4, 2013, 4 pages.

FAIPP Pre-Interview Communication dated Oct. 24, 2012, U.S. Appl. No. 12/786,277, filed May 24, 2010, 4 pages.

Notice of Allowance dated Jan. 17, 2013, U.S. Appl. No. 12/786,277, filed May 24, 2010, 14 pages.

Notice of Allowance dated Jan. 20, 2012, U.S. Appl. No. 12/502,227, filed Jul. 13, 2009, 4 pages.

Notice of Allowance dated Feb. 13, 2015, U.S. Appl. No. 13/857,144, filed Apr. 4, 2013, 24 pages.

Office Action dated Apr. 6, 2010, U.S. Appl. No. 11/484,420, filed Jul. 11, 2006 13 pages.

Advisory Action dated Dec. 13, 2011, U.S. Appl. No. 12/502,227, filed Jul. 13, 2009, 4 pages.

* cited by examiner

INTEGRATED USER PROFILE ADMINISTRATION TOOL

CROSS-REFERENCE TO RELATED APPLICATIONS

This application includes subject matter related to U.S. patent application Ser. No. 10/960,535, filed Oct. 7, 2004, entitled "Call Center Dashboard", by B. Balasubramanian, et al, and U.S. patent application Ser. No. 10/994,997, filed Nov. 22, 2004, entitled "Single Sign-On System and Method", by R. Himawan, et al, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a system and method of allowing administrative resetting and management of authentication and authorization for users of computer based applications. More particularly, embodiments of the present invention provide for the administrative resetting of passwords and synchronization of user profiles for users of single sign-on systems.

BACKGROUND OF THE INVENTION

Employees in a business may use an automated sign-on system in order to access multiple computer programs or applications during the course of performing their job in a corporate setting. Such a system may contain information regarding the passwords, authorization levels, and applications that a user may be permitted to access. This information may be contained in a single location or across a variety of relational databases.

As a corporate workforce changes, users may be added and deleted from the automated sign-on system. Often times a user or group of users will be in a situation in which one or more of their application passwords has to be reset. The application may be within the automated sign-on system or exterior to this system. In addition, internal changes such as promotions, transfers, and temporary leaves, can also affect the system information of a user.

SUMMARY OF THE INVENTION

In one embodiment, a computer system is provided including a single sign-on system with applications and a data store storing user profiles, each including a user ID, wherein each of the user profiles has a corresponding application password for one or more of the applications, and a user profile administration tool. The user profile administration tool includes a password provisioning section where an administrator selects a user profile and further selects an application type. The application type includes an application type wherein the administrator resets the password for one or more of the applications. The application type also includes a stand-alone application type wherein the administrator resets a password for a stand-alone application. The user profile administration tool further includes a password synchronizing section wherein the user profile administration tool automatically synchronizes the application passwords with each of the corresponding user profiles.

In another embodiment, a computer system is provided that includes a call center database system having at least one call center application, a call center storage database storing at least one user profile having a user ID, where each of the user profiles has a corresponding application password for one or more of the call center applications, and a user profile administration tool.

The user profile administration tool includes a role manager section where an administrator selects a role management user profile from among the user profiles and modifies a user role for the role management user profile by assigning or unassigning a role level for the user role. The user profile administration tool further includes a user provisioning section where the administrator creates a new user and associated application password in one or more of the call center applications. The administrator creates a new user profile to store in the call center storage database when the new user does not have a corresponding user profile.

In an embodiment, the user profile administration tool includes a user profile management section where the administrator selects a profile management user profile from among the user profiles and modifies the profile management user profile by editing or deleting the management user profile. Even further, the user profile administration tool includes a password provisioning section where the administrator selects a provisioning user profile from among the user profiles and selects an application type. The application type includes a call center application type where the administrator resets the application password corresponding to the provisioning user profile for one or more of the one call center applications. The application type also includes a stand-alone application type wherein the administrator resets a stand-alone password corresponding to the provisioning user profile for a stand-alone application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Employees working in call centers may employ many applications in the course of receiving and responding to customer calls. Call center employees may be required to remember many different passwords to access all of the applications. With passwords being changed periodically and with application password criteria requiring mixed character strings, it will be readily appreciated that call center employees might find it difficult to remember all of the passwords to the applications that they use. One way of coping with this difficulty is to use a single sign-on solution, such as a call center dashboard (CCDB) employing a single sign-on capability as described in one or more or the patent applications that are incorporated herein by reference above. These systems are examples, and others may be used, of a single sign-on system that enables a user to sign-on to all or some of their applications with a single sign-on procedure requiring only one ID and password.

The systems and applications serviced by a single sign-on system are independent and typically do not share common databases or security systems or protocols. Therefore, single sign-on greatly simplifies password management for a user by providing the user with a single password or log-in for a plurality of applications. While management and utility functions for single, integrated password or security system are somewhat straightforward, such management for disparate, otherwise unrelated applications, may present significant challenges.

A system administrator for the CCDB may be requested to reset the application passwords for one or more CCDB users. According to one embodiment, the present disclosure provides the User Profile Administration (UPA) tool to enable the CCDB administrator to reset the application passwords for the applications for a single CCDB user or group of CCDB users. In addition, a password reset function of the UPA tool may allow the administrator to reset the passwords for CCDB users of applications not otherwise accessible by the CCDB system, in other words, stand-alone applications. The UPA tool assists the CCDB administrator by provisioning (or synchronizing) the various passwords of the various users across a single or number of databases.

The UPA tool may also allow the CCDB administrator to manage the various user profiles (i.e., authorization and authentication data stores containing information concerning the passwords, application access authorization, and application authority levels, associated with the various user IDs). With the UPA tool, the CCDB administrator can update and synchronize the user profiles, for example, if a user is promoted, changes organizations within the corporation, or goes on an extended absence. In addition, if a user leaves the corporation, the CCDB administrator can then delete the particular user's profile.

Figure 1:
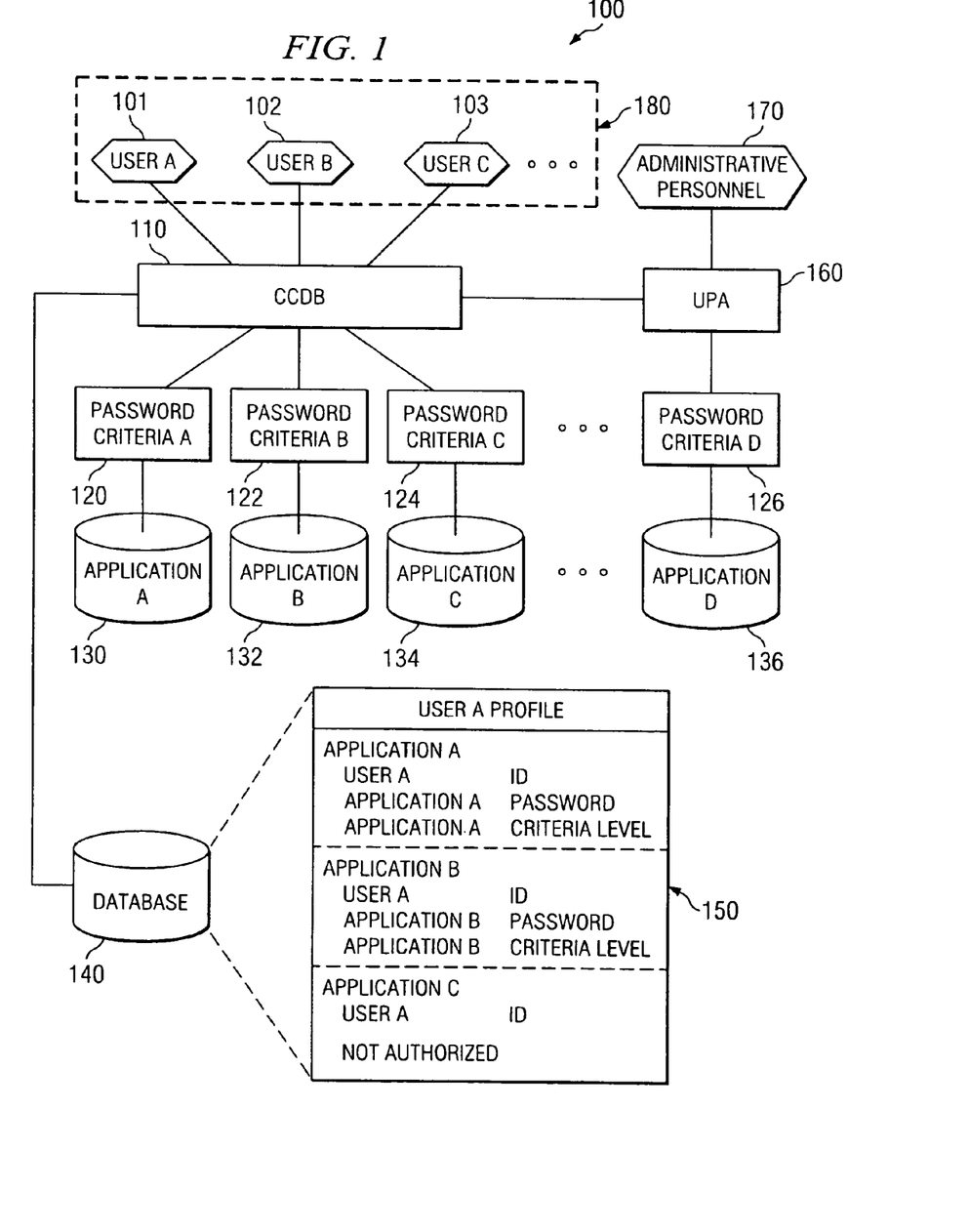
FIG. 1 is a block diagram of a system including a call center database and an integrated user profile administration tool in accordance with one embodiment of the present disclosure.

FIG. 1 is a simplified block diagram illustrating an embodiment of a computer system 100 incorporating a UPA tool 160. In this embodiment, call center employees (user A 101, user B 102, user C 103, . . . ) access a single sign-on system represented by the CCDB 110. The CCDB 110 allows the users to gain access to a plurality of applications (for example three applications are shown in FIG. 1) through one sign-on to the CCDB 110 system.

In turn, the CCDB 110 system maintains a database 140 containing a user profile 150 for each of the individual users 180. The user profile 150 may contain information associated with a unique user ID. In the example profile shown, the user profile 150 for user A 101 contains the application passwords and criteria levels (i.e., authority level or role) for application A 130 and application B 132. User A 101 is not allowed access to application C 134 in this profile. The application passwords need not be seen or known by the users. If the application requires a new password or changed password after a certain period of time, the CCDB 110 system will automatically generate a new random password and update the user profile 150.

Passwords for each application are generated according to the specific password criteria for the corresponding application. In the case of an automatically generated random password, the CCDB 110 system will use the password criteria 120 for application A 130. This allows the CCDB 110 system to use commercial off the shelf (COTS) applications without expensive modifications necessary to create uniform password criteria.

In addition to the particular application passwords, a user profile 150 may contain a particular application criteria level. Some applications offer uniform access regardless of the identity of the user. Other applications offer different levels of access based, for example, on the level of responsibility or position of the individual user. Such other applications may only allow visual access to data for a lower level user while allowing other users to view and modify the data. Not all applications have a corresponding criteria level, but those that do may have the criteria level stored in the user profile 150.

Only one database 140 is shown in FIG. 1, but the actual data contained in a user profile may be in two or more databases. The data is shown as a single user profile 150, but data for numerous users may be maintained in the database 140. As can be expected, two or more databases may be related by a unique identifier (e.g., the user ID) to create a composite user profile corresponding to the user profile 150 shown in FIG. 1.

The UPA tool 160, which will be explained in detail below, allows an administrative personnel 170 member to reset passwords for individual users (e.g., user A 101) or groups of users 180. The UPA tool 160 causes the CCDB 110 to reset the passwords for applications or groups of applications outside of an application's regularly occurring change password request cycle.

In addition to resetting the passwords for users, the UPA tool 160 automatically provisions or synchronizes the various passwords for a database 140 or databases containing the respective portion of the profile containing the password. Each of the separate applications (A 130, B 132, C 134, etc.) may contain an application database storing the user ID and password for the corresponding application. An administrator may use the UPA tool 160 to reset the passwords for each of the applications either directly or via scripting through the login screens of the COTS applications. During synchronization, the new passwords stored in the application databases are updated in the respective portion of the user profile 150. For example, if user A 101's password and criteria level for application A 130 were stored in a first application database, and their password and criteria level for application B 132 were stored in a second application database, the UPA tool 160 would update the corresponding portions of their user profile 150.

The administrative personnel 170 would be able to reset all of user A 101's passwords without intervention by user A 101. New passwords for each of User A 101's applications could be generated according to the application's specific password criteria (which is discussed further below) and stored in the corresponding application's database. The user profile tool 160 would then synchronize the reset passwords in the individual application databases with the corresponding portions of the user profile 150 of User A 101. User A 101 would then be able to sign-on to the CCDB 110 system with their single sign-on ID and password. The CCDB 110 system would automatically use the newly reset passwords without requiring any additional intervention by the User A 101. All of the passwords of the applications of User A 101's user profile 150 can be reset and synchronized without requiring any action from User A 101. In some cases, the User A 101 may be unaware that their passwords have been reset.

In a computer system such as the one shown in the embodiment, there may be additional applications not accessed by the users 180 through the CCDB 110 system. The UPA tool 160 may allow the administrative personnel 170 to reset the passwords of the stand-alone application (shown as application D 136 in FIG. 1) in addition to the various applications accessed through the CCDB 110. The stand-alone applications require the users 180 to log on outside of the CCDB 110 system. In addition, the users 180 are required to maintain their own passwords for the stand-alone applications. In such a case, the UPA tool 160 may cause the stand-alone application to reset the password of a User A 101 to a single use password. For example, the single use password may be a term such as "PASSWORD01". User A 101 could then log on to the stand-alone application with their user ID and "PASSWORD01" as the password. The stand-alone application would then require User A 101 to change the password immediately upon granting access to the stand-alone application.

Figure 2:
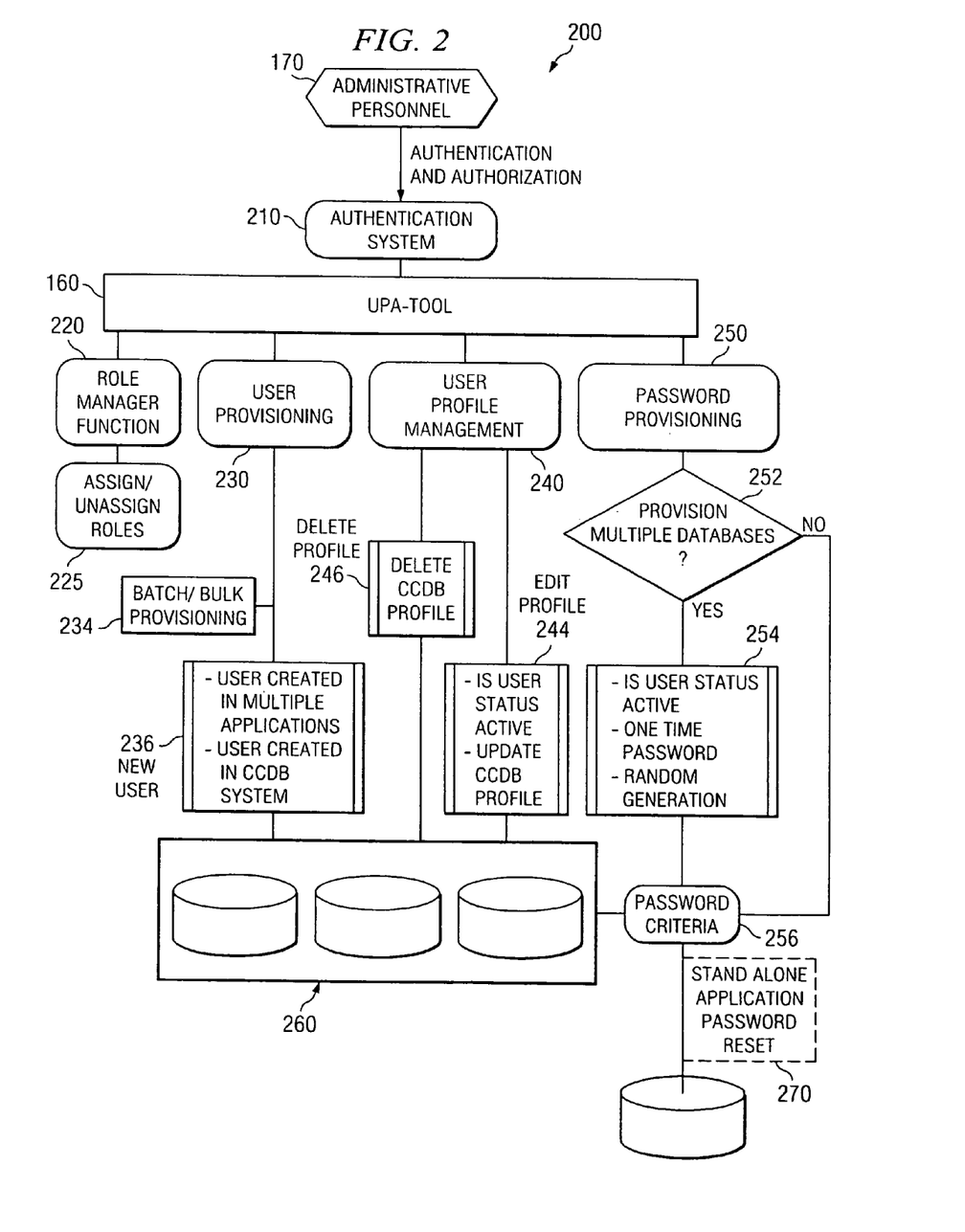
FIG. 2 is a block diagram of an integrated user profile administration tool according to an embodiment of the disclosure.

FIG. 2 is a block diagram illustrating a portion of a system 200 for implementing embodiments of the present disclosure. In FIG. 2, details surrounding the functions and use of the UPA tool 160 are shown.

Administrative personnel 170 are authenticated and authorized to access the UPA tool 160 via a security system. In the present embodiment, an authentication system 210 is used to prevent unauthorized access to the UPA tool 160. After accessing the UPA tool 160, the administrative personnel 170 are able to perform various functions related to the management of user profiles (e.g., a CCDB profile such as user profile 150) and resetting of CCDB application passwords (e.g., applications 130-134 shown in FIG. 1) and non-CCDB application passwords (e.g., application D 136 shown in FIG. 1).

As previously stated, an individual user may have different criteria levels or roles specific to an individual application depending upon the user's responsibility level or position. After accessing the UPA tool 160, the administrator 170 may wish to manage the roles contained in user's profiles. The administrative personnel 170 may access the role manager function 220 of the UPA tool 160 in order to assign and unassign roles 225. Roles may need to be changed as users are promoted and demoted, or change their job assignments, possibly through a transfer to a separate organization within the same corporation. The role manager function 220 allows an administrator 170 to increase or decrease the role or criteria level (i.e., also referred to as an authority level for a particular application) for an individual user or a group of users.

Administrative personnel 170 are able to perform user provisioning 230 with the CCDB system. If a new user is created in an underlying CCDB application 236, then the user provisioning function 230 of the UPA tool 160 is able to update or synchronize the user's profile in the CCDB database (e.g., FIG. 1, DB 140).

The user provisioning 230 has been described with a single user, but there are times in which an entire department is required to be given access to a new or existing CCDB application. In this case, the administrative personnel 170 create new users for the application through batch/bulk provisioning 234. As with the example of the individual user, the profiles of each of the members (such as those having a common team or department notation or number in the user's profile or elsewhere) of the batch/bulk provision 234 are automatically updated or synchronized with the CCDB databases (e.g., FIG. 1, DB 140).

The UPA tool 160 also adds new users to the CCDB system. This may be done in addition to entering the user across multiple applications of the CCDB 110 system.

As described earlier, the user profile 150 (FIG. 1) allows an individual user to access multiple applications in a CCDB 110 system. However, the complexity of the current business environment may require that an individual user's profile 150 needs to be edited or deleted. By accessing the user profile management 240 aspect of the UPA tool 160, administrative personnel can edit 244 or delete 246 a user's profile.

The status of the user is initially checked to ensure it is active in order to allow a profile to be edited 244. If a user status is inactive, the editing 244 will be denied until the status changes.

For an active status user, the administrative personnel 170 can edit the user's profile 150 (FIG. 1). When the administrative personnel 170 have completed editing the user's profile 150, the CCDB database or databases are synchronized to reflect the updated user profile 150.

Conversely, there are times when a user is terminated from the corporation or when the user goes on an indefinite leave of absence. In this case, the administrative personnel 170 may decide that it is necessary to delete 246 the user profile 150 (FIG. 1). The delete 246 aspect of the user profile management 240 portion of the UPA tool 160 allows an administrator 170 to delete a user's CCDB profile 150.

As with the user provision portion of the UPA tool 160, the user profile management portion 240 has been described using only a single user. However, the same description is applicable to a group of users 180 (FIG. 1) using batch or bulk processing.

When a CCDB user is locked out of an application, the level of customer response seen by the consumer falls and the productivity of the CCDB user is diminished. In order to quickly restore access to the user, an administrator 170 may use the password provisioning 250 function of the UPA tool 160.

Password provisioning 250 resets a user's password and synchronizes or updates the user's profile 150 (FIG. 1). The user's profile is initially checked at 252 to determine if it includes multiple databases, such as would be the case with multiple CCDB applications. If there are multiple databases involved, the password provisioning 250 function then checks the user's status to determine if the status is active 254. If the status is inactive, then the resetting is inhibited until such time that the status changes.

Once the user status is determined to be active, the administrative personnel 170 can reset the passwords of a single or multiple CCDB applications. The password provisioning 250 function works with the password resetting capability of the individual application. For example, the UPA tool 160 resets the passwords of the applications either directly or via scripting through the log in screens of the COTS applications. When using scripting, the application may respond with a standard single use password. The single use password is required to be changed immediately upon accessing the application. The UPA tool 160 then responds with a randomly generated password appropriate for the password criteria 256 of the particular application. The randomly generated password may be stored in a corresponding application database. The UPA tool 160 then updates the randomly generated password with the user's profile 150 in the CCDB database or databases 260.

In addition to the ability to reset passwords for CCDB applications, the UPA tool 160 allows administrative personnel to reset passwords for the so called stand-alone applications 270. Stand-alone applications are those applications that are not accessed by the log in functioning of the CCDB 110 system. Since the stand-alone applications are outside of the CCDB 110 system, the users 180 may be required to maintain their passwords for these applications.

However, administrative personnel using the UPA tool 160 can access stand-alone applications either directly or through scripting to request a new password. The standalone password resets to a single use password, such as described above. The user is then able to access the standalone application using their user ID and the reset password term. Immediately upon accessing the stand-alone application, the user will be responsible for changing the password to a new password corresponding the stand-alone application's password criteria 256.

Figure 3:
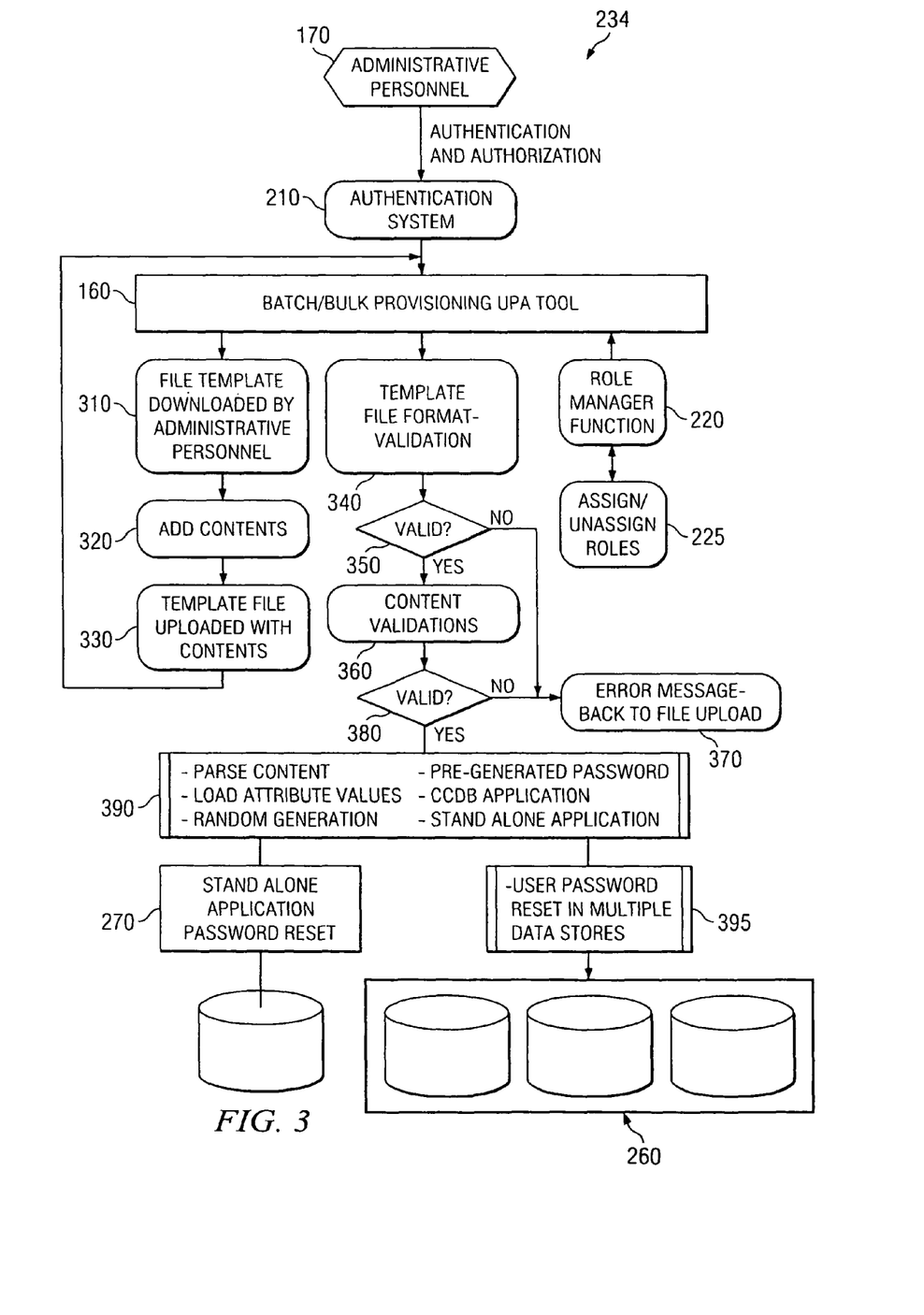
FIG. 3 is a block diagram of batch/block provisioning functions of an integrated user profile administration tool according to an embodiment of the disclosure.

FIG. 3 is a block diagram illustrating a portion of a system 200 for implementing embodiments of the present disclosure. In FIG. 3, details surrounding the batch/bulk provisioning functions 234 of the UPA tool 160 are shown.

Administrative personnel 170 are authenticated and authorized to access the batch/bulk provisioning functions 234 of the UPA tool 160 via a security system. In the present embodiment, an authentication system 210 is used to prevent unauthorized access to the batch/bulk provisioning functions 234 of the UPA tool 160. After accessing the UPA tool 160, the administrative personnel 170 are able to perform batch/bulk provisioning functions related to the management of multiple users' profiles (e.g., CCDB profiles such as user profile 150 shown in FIG. 1) and resetting of CCDB application passwords (e.g., applications 130-134 shown in FIG. 1) and non-CCDB application passwords (e.g., application D 136 shown in FIG. 1).

A group of users may have different criteria levels or roles specific to an individual application depending upon the group of users' responsibility levels or positions. After selecting the batch/bulk provisioning functions 234 of the UPA tool 160, the administrator 170 may wish to manage the roles contained in a group of users' profiles. The administrative personnel 170 may access the role manager function 220 of the UPA tool 160 in order to assign and unassign roles 225 for a group of users. Roles may need to be changed as a group of users are promoted and demoted, or change their job assignments, possibly through transfers to a separate organization within the same corporation. The role manager function 220 allows an administrator 170 to increase or decrease the roles or criteria levels (i.e., also referred to as an authority level for a particular application) for a group of users.

Administrative personnel 170 are able to select the batch/bulk provisioning functions 234 of the UPA tool 160 to perform user provisioning for a group of users in the CCDB system. If a group of new users is added to an underlying CCDB application, then the batch/bulk provisioning functions 234 of the UPA tool 160 are able to update or synchronize the group of users' profiles in the CCDB database (e.g., FIG. 1, DB 140).

User provisioning has been described earlier with a single user, but when an entire department is required to be given access to a new or existing CCDB application, the administrative personnel 170 create new users for the application through the batch/bulk provisioning functions 234 of the UPA tool 160. As with the example of the individual user, the profiles of each of the group of users (such as those having a common team or department notation or number in the users' profiles or elsewhere) are automatically updated or synchronized with the CCDB databases (e.g., FIG. 1, DB 140). After administrative personnel 170 select the batch/bulk provisioning functions 234 of the UPA tool 160, a file template is downloaded 310 by administrative personnel 170. The file template includes fields for contents of a group of users' profiles. The administrative personnel 170 may add contents 320 to the fields for a group of users' profiles. The contents added to the fields for a group of users' profiles may include information concerning the passwords, application access authorization, and application authority levels, associated with the various user IDs, such as the users' first and last names. After the administrative personnel 170 add contents 320 to the fields for a group of users' profiles, the administrative personnel 170 uploads the template file with contents 330.

The batch/bulk provisioning functions 234 of the UPA tool 160 also enable adding a group of new users to the CCDB system. This may be done in addition to entering a group of users across multiple applications of the CCDB 110 system as described above. As with the user provisioning portion of the UPA tool 160, the user profile management portion has been described earlier using only a single user. However, the same description is applicable to a group of users 180 (FIG. 1) using the batch/bulk provisioning functions 234 of the UPA tool 160 described above.

When the administrative personnel 170 uploads the template file with contents 330, the batch/bulk provisioning functions 234 of the UPA tool 160 trigger a template file format validation 340. The template file format validation 340 validates that the uploaded template file format matches the template file format that was downloaded by the administrative personnel 170. If the uploaded template file format matches the template file format that was downloaded by the administrative personnel 170, the batch/bulk provisioning functions 234 of the UPA tool 160 determine that the template file format is valid 350, and the UPA tool 160 begins the content validations 360. If the batch/bulk provisioning functions 234 of the UPA tool 160 determine that the template file format is not valid 350, the UPA tool 160 sends an error message back to file upload 370.

In content validations 360, the UPA tool 160 validates the content for each line of information in the template file. If the template file lacks required information for a user profile, the UPA tool 160 determines that the content is not valid 380. For example, the user ID is required information for a user profile. If the content is not valid 380, the UPA tool 160 sends an error message back to file upload 370.

At block 370 when there is an upload error, the UPA tool 160 sends an error message that specifies the reason that the template file is not valid. The reason may be that the template file format does not match the downloaded template file format, or the template file may lack specific required information. The administrative personnel 170 that review the error message may take corrective measures to insure that the template file format uploaded matches the template file format downloaded and to insure that the template file contains all required information.

If the template file contains all required information for a user profile, the UPA tool 160 determines that the content is valid 380. If the content is valid 380, the UPA tool 160 parses the content 390 in the template file. After parsing the content 390, the UPA tool 160 loads attribute values in each specified application to enable each user of the group of users to access each application specified for each user, and provisions a password for each application for each user of the group of users. The password provisioning may be for CCDB applications or for a standalone application.

Password provisioning resets the passwords for each user in the group of users and synchronizes or updates the users' profiles. The users' profiles are initially checked to determine if they reference multiple databases, such as would be the case with multiple CCDB applications.

The administrative personnel 170 can reset the passwords of a single or multiple CCDB applications. The password provisioning function works with the password resetting capability of the individual application. For example, the UPA tool 160 resets the passwords of the applications either directly or via scripting through the log in screens of the COTS applications. When using scripting, the application may respond with a standard single use password. The single use password is required to be changed immediately upon accessing the application. The UPA tool 160 then responds with randomly generated passwords appropriate for the particular application. The randomly generated passwords may be stored in a corresponding application database 260. The UPA tool 160 then resets 395 the randomly generated passwords with the users' profiles in the CCDB database or databases 260.

In addition to the ability to reset passwords for CCDB applications, the UPA tool 160 allows administrative personnel 170 to reset passwords for the so called stand-alone applications 270. Stand-alone applications include those applications that are not accessed by the log-in functionality of the CCDB 110 system. Since the stand-alone applications may be outside of the CCDB 110 system, each user in the group of users 180 may be required to maintain their passwords for these applications.

However, administrative personnel 170 using the UPA tool 160 can access stand-alone applications either directly or through scripting to request new passwords for each user in a group of users. The stand-alone passwords reset to single use passwords, such as described above. Each user in the group of users is then able to access the stand-alone application using their user ID and the reset password term. Immediately upon accessing the stand-alone application, each user in the group of users will be responsible for changing the password to a new password corresponding to the stand-alone application.

Figure 4:
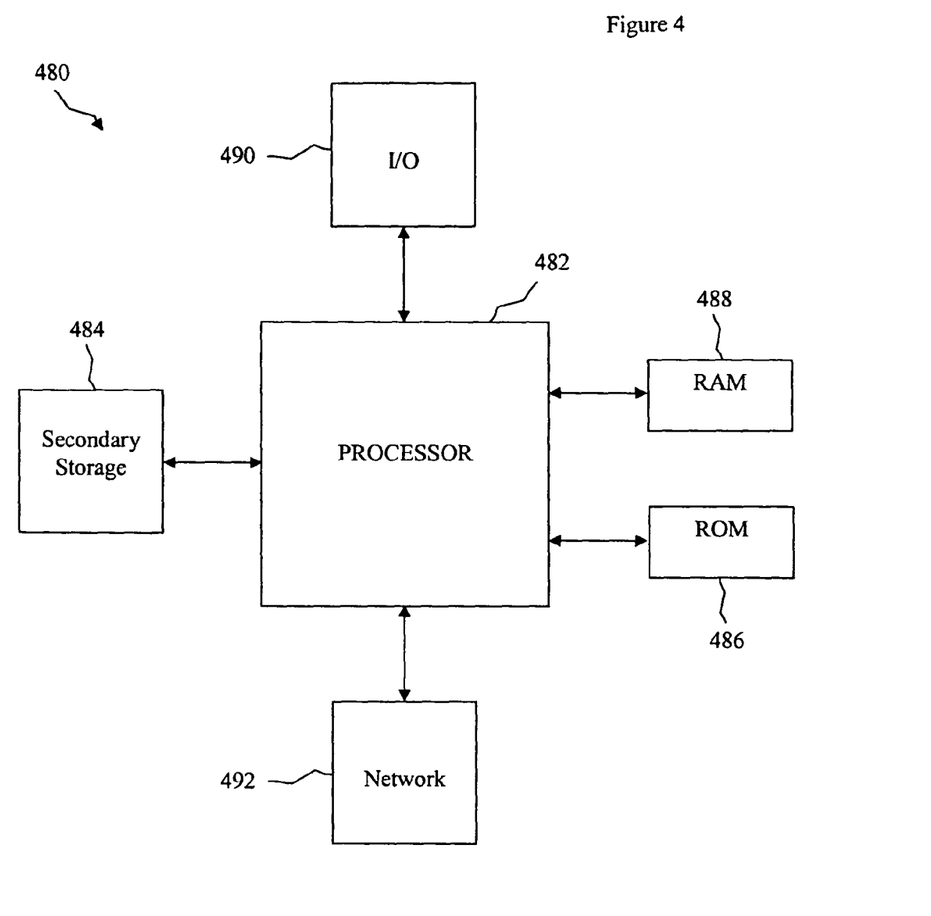
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer system for managing application passwords and user authority levels via a user profile administration tool integrated with a single sign-on system, comprising:
   a plurality of authentication databases for a plurality of applications accessible to a user, wherein each application of the plurality of applications is associated with one of the plurality of authentication databases, and wherein each authentication database of the plurality of authentication databases stores an application password for a corresponding application of the plurality of applications;
   a single sign-on system with a data store storing a user profile of the user, wherein the user profile includes a plurality of application passwords for the plurality of applications for which the user has access and authority levels of the user for the plurality of applications, and wherein the single sign-on system, responsive to the user being signed-on to the single sign-on system using a single sign-on password, enables the user to access each application of the plurality of applications in accordance with a corresponding authority level of the user for the application in the user profile using a corresponding application password for the application in the user profile; and
   a user profile administration tool that validates, via bulk provisioning functions, a template file that matches a format of a downloaded template file and that comprises required information for each user profile of a group of user profiles associated with the template file, the user profile administration tool comprising:
      a password provisioning component stored in a non-transitory memory, that when executed by a processor after validation of the template file, resets, for a first application of the plurality of applications, a first application password of the plurality of application passwords stored in a first authentication database of the plurality of authentication databases to a reset application password without the user being aware of the reset of the first application password, wherein the user profile administration tool automatically synchronizes the reset application password in the first authentication database with the first application password for the first application in the user profile, and
      a role manager component stored in a non-transitory memory, that when executed by a processor, changes, for the first application, a first authority level of the user in the user profile to a new authority level based on the user changing roles, wherein the new authority level grants the user different access rights to the first application than the first authority level, and wherein the single sign-on system, responsive to the user being signed-on to the single sign-on system using the single sign-on password, enables the user to access the first application in accordance with the new authority level in the user profile using the reset application password for the first application in the user profile.

2. The computer system of claim 1, wherein the user profile administration tool further comprises a user provisioning component stored in a non-transitory memory, that when executed by a processor, creates a new user in at least one application for which the new user has access.

3. The computer system of claim 1, wherein the user profile administration tool further comprises a user profile management component stored in a non-transitory memory, that when executed by a processor, edits and deletes the user profile.

4. The computer system of claim 1, wherein the data store comprises:
   two or more relational databases storing a corresponding two or more portions of the user profile; and
   wherein the two or more relational databases are related through unique user IDs.

5. The computer system of claim 1, wherein the password provisioning component further resets a password of a stand-alone application not otherwise accessible by the single sign-on system with a single use password.

6. The computer system of claim 1, wherein the user profile further comprises a user status, wherein when the user status of the user profile is active, the password provisioning component enables resetting any of the plurality of application passwords, and wherein when the user status of the user profile is inactive, the password provisioning component prevents resetting of any of the plurality of application passwords.

7. The computer system of claim 1, further comprising an application password criteria for each of the plurality of applications of the single sign-on system, wherein the application password criteria for each application describes a format for an application password for the corresponding application.

8. The computer system of claim 7, wherein at least some of the plurality of application passwords have different password criteria.

9. The computer system of claim 7, wherein the password provisioning component resets the first application password stored in the first authentication database according to the password criteria for the first application.

10. A computer implemented method for managing application passwords and user authority levels via a user profile administration tool integrated with a single sign-on system, comprising:
   for each application of a plurality of applications accessible to a user, storing an application password for the application in an authentication database of a plurality of authentication databases, wherein each application of the plurality of applications is associated with one of the plurality of authentication databases;
   storing a user profile of the user in a data store associated with a single sign-on system, wherein the user profile includes a plurality of application passwords for the plurality of applications for which the user has access and authority levels of the user for the plurality of applications;

responsive to the user being signed-on to the single sign-on system using a single sign-on password, enabling, by the single sign-on system, the user to access each application of the plurality of applications in accordance with a corresponding authority level of the user for the application in the user profile using a corresponding application password for the application in the user profile;

validating, by a user profile administration tool stored in a non-transitory memory and executable by a processor via bulk provisioning functions, a template file that matches a format of a downloaded template file and that comprises required information for each user profile of a group of user profiles associated with the template file;

for a first application of the plurality of applications and after validation of the template file, resetting, by a password provisioning component of the user profile administration tool, a first application password of the plurality of application passwords stored in a first authentication database of the plurality of authentication databases to a reset application password without the user being aware of the reset of the first application password;

automatically synchronizing, by the user profile administration tool, the reset application password in the first authentication database with the first application password for the first application in the user profile;

for the first application, changing, by a role manager component of the user profile administration tool, a first authority level of the user in the user profile to a new authority level based on the user changing roles, wherein the new authority level grants the user different access rights to the first application than the first authority level; and responsive to the user being signed-on to the single sign-on system using the single sign-on password, enabling, by the single sign-on system, the user to access the first application in accordance with the new authority level in the user profile using the reset application password for the first application in the user profile.

11. The computer implemented method of claim 10, further comprising creating, by a user provisioning component of the user profile administration tool, a new user in at least one application for which the new user has access.

12. The computer implemented method of claim 10, further comprising editing and deleting, by a user profile management component of the user profile administration tool, the user profile.

13. The computer implemented method of claim 10, wherein the data store comprises:
two or more relational databases storing a corresponding two or more portions of the user profile; and
wherein the two or more relational databases are related through unique user IDs.

14. The computer implemented method of claim 10, further comprising resetting, by the password provisioning component, a password of a stand-alone application not otherwise accessible by the single sign-on system with a single use password.

15. The computer implemented method of claim 10, wherein the user profile further comprises a user status.

16. The computer implemented method of claim 15, further comprising:
enabling, by the password provisioning component, resetting any of the plurality of application passwords when the user status of the user profile is active; and
preventing, by the password provisioning component, resetting of any of the plurality of application passwords when the user status of the user profile is inactive.

17. The computer implemented method of claim 10, wherein each of the plurality of applications of the single sign-on system has an application password criteria, and wherein the application password criteria for each application describes a format for an application password for the corresponding application.

18. The computer implemented method of claim 17, wherein at least some of the plurality of application passwords have different password criteria.

19. The computer implemented method of claim 17, wherein the password provisioning component resets the first application password stored in the first authentication database according to the password criteria for the first application.

* * * * *